UNITED STATES PATENT OFFICE.

NORBERT M. LA PORTE, OF CHICAGO, ILLINOIS, ASSIGNOR TO SHARP & DOHME, OF BALTIMORE, MARYLAND, A CORPORATION OF NEW JERSEY.

DOUBLE SALT OF ALUMINUM AND POTASSIUM.

1,377,081.   Specification of Letters Patent.   Patented May 3, 1921.

No Drawing.   Application filed October 21, 1920.   Serial No. 418,540.

*To all whom it may concern:*

Be it known that I, NORBERT M. LA PORTE, a citizen of the United States, residing at Chicago, in the county of Cook and State of Illinois, have invented certain new and useful Improvements in Double Salt of Aluminum and Potassium; and I do hereby declare the following to be a full, clear, and exact description of the invention, such as will enable others skilled in the art to which it appertains to make and use the same.

This invention relates to chemicals having a medicinal action upon the human body and more particularly to a double salt of aluminum and potassium.

Its object is to produce a substance, susceptible of absorption into the blood stream of the living body, and enabling the blood stream of persons whose bones, soft tissues and fluids have become toxic through the invasion of pyogenic infections successfully to resist and destroy the invaders and their toxins.

It consists in a double nitrate, or series of double nitrates, of aluminum and potassium, that possess valuable astringent, leucocytosic and phagocytosic properties that render them most efficient agents for accomplishing the aforesaid object. I prefer to designate these salts as nitrato salts or more specifically aluminum-potassium nitrato salts. These aluminum-potassium nitrato salts are relatively devoid of toxic action.

I have found that the double nitrates herein referred to exercise marked influence upon the metabolism and upon the nature of the blood, increasing the number of red corpuscles and of both leucocytes and phagocytes in the blood, whereby the ability of the system of a person medicinally treated with said salts to resist and overcome the invasion of pathogenic organisms and other toxins is materially increased, and a feeling of general improvement becomes speedily apparent.

The said nitrato salts may be applied externally to the skin with a suitable vehicle. The vehicle may be a suitable non-irritant substance sufficiently absorptive to suspend the salts and absorb pus, or exudates. Experience has taught that ordinary rolled oats, sawdust, kaolin, bran, are suitable vehicles.

By the term "dose" I mean the dry weight of the nitrato salts to be incorporated in the dry weight of the vehicle for one treatment. I consider the normal unit "dose" to consist of thirteen grains of dry salt to one ounce of dry oats or similar vehicle. The dose, however, may in practice vary from about 7 grains to 50 or more grains per ounce of dry oats or like vehicle.

Thus far I have treated human patients by external applications, only, of said nitrates. I have treated animals hypodermatically and orally with a view of establishing toxicity and change of metabolism. It has been learned that the toxicity is practically *nil*. Animals fed for weeks on a diet containing considerable of the salts did not appear to be affected in their general condition.

The new double salts of aluminum and potassium to which this invention appertains have the general formula $Al(NO_3)_3 \cdot yKNO_3 \cdot H_2O$. The formulas of the several salts produced by me are as follows: $Al(NO_3)_3 \cdot 3KNO_3 \cdot 10H_2O$; $Al(NO_3)_3 \cdot 2KNO_3 \cdot xH_2O$, and $Al(NO_3)_3 \cdot KNO_3 \cdot xH_2O$, $x$ being usually ten, although under certain atmospheric conditions it may be less or more, the limits lying substantially between five and fifteen.

The salt represented by the formula $Al(NO_3)_3 \cdot 3KNO_3 \cdot 10H_2O$ is the predominating substance obtained upon crystallization of a solution of potassium nitrate and aluminum nitrate in nitric acid; the other two salts named may be crystallized from the mother liquor after removal of the first.

In order to obtain the said double nitrates, suitable quantities of potassium nitrate and aluminum nitrate crystals are introduced into concentrated nitric acid kept hot by means of a water bath until all crystals are dissolved. The quantity of crystallized aluminum nitrate and potassium nitrate used should be in the proportion of the molecular weight of one molecule of aluminum nitrate to three times the molecular weight of one molecule of potassium nitrate. For example, 375 grams of aluminum nitrate, and 303 grams of potassium nitrate in sufficient hot concentrated nitric acid to dissolve the substance will produce a solution from which the said double salt $Al(NO_3)_3 \cdot 3KNO_3 \cdot 10H_2O$ will crystallize out when the solution has cooled. By concentrating the mother liquor left after the removal of the said predominant double nitrate one or the other or a mixture of the double nitrates $Al(NO_3)_2.2KNO_3.xH_2O$, and $Al(NO_3)_3.KNO_3.xH_2O$ may be crystallized out. The crystals may be separated from the mother liquor by a centrifuge or a suction pump and dried in a vacuum desiccator over calcium oxid in a current of dry air.

In practice I have found that about 500 cubic centimeters of concentrated nitric acid is a suitable quantity of acid in which to dissolve one kilo of aluminum nitrate and potassium nitrate mixed in the proportions previously indicated.

The described nitrato salts or double nitrates crystallize from the concentrated nitric acid solution in the form of colorless rhombic and monoclinic crystals. They are readily soluble in cold or warm water in substantially all proportions. They possess an astringent, slightly metallic taste.

Having described my invention what I claim and desire to secure by Letters Patent of the United States is:

1. A new chemical substance consisting of a double nitrate of aluminum and potassium.

2. A new chemical substance consisting of a double salt of aluminum nitrate and potassium nitrate represented by the formula $Al(NO_3)_3.yKNO_3.xH_2O$.

3. A new chemical substance consisting of a double salt of aluminum nitrate and potassium nitrate represented by the formula $Al(NO_3)_3.3KNO_3.10H_2O$.

4. The process of making a double aluminum-potassium salt which consists in dissolving a quantity of crystallized aluminum nitrate and a quantity of potassium nitrate in the proportions of one molecule of the former substance to three of the latter substance in sufficient hot concentrated nitric acid to completely dissolve said substances, and crystallizing out the said double salt.

In testimony whereof I affix my signature.

NORBERT M. LA PORTE.